US008175136B2

(12) United States Patent
Matsumoto

(10) Patent No.: US 8,175,136 B2
(45) Date of Patent: May 8, 2012

(54) NOISE CANCELLATION METHOD, RECEIVER CIRCUIT, AND ELECTRONIC INSTRUMENT

(75) Inventor: Kazumi Matsumoto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 970 days.

(21) Appl. No.: 12/171,655

(22) Filed: Jul. 11, 2008

(65) Prior Publication Data
US 2009/0022210 A1 Jan. 22, 2009

(30) Foreign Application Priority Data

Jul. 18, 2007 (JP) ................... 2007-186581

(51) Int. Cl.
H04B 1/707 (2011.01)
H04B 1/04 (2006.01)
H04B 1/10 (2006.01)
H04L 25/08 (2006.01)
(52) U.S. Cl. .................. 375/148; 375/150; 375/346
(58) Field of Classification Search .................. 375/147, 375/148, 150, 343, 345, 346; 342/357.2, 342/357.51, 357.59, 357.63, 357.71
See application file for complete search history.

(56) References Cited

U.S. PATENT DOCUMENTS

| 6,236,354 B1* | 5/2001 | Krasner .................. 342/357.59 |
| 6,327,298 B1* | 12/2001 | Grobert .......................... 375/148 |
| 7,050,388 B2 | 5/2006 | Kim et al. |
| 2007/0098121 A1* | 5/2007 | Casabona et al. ............. 375/346 |

* cited by examiner

Primary Examiner — Betsy Deppe
(74) Attorney, Agent, or Firm — Global IP Counselors, LLP

(57) ABSTRACT

A noise cancellation method includes: inputting an interference wave signal detected near a receiver section, and changing the phase and the amplitude of the input signal to generate a cancellation signal that cancels the input signal; performing correlation calculations on a signal obtained by adding the cancellation signal to a communication signal received by the receiver section and a code replica of a PRN code used for the communication signal, within a given correlation calculation target range that is included within a code phase range and a frequency range; and performing the correlation calculations within a non-signal range outside the correlation calculation target range, and controlling a phase shift amount and an amplitude change rate of the input signal based on the correlation calculation result.

2 Claims, 6 Drawing Sheets

NOISE CANCELLATION METHOD, RECEIVER CIRCUIT, AND ELECTRONIC INSTRUMENT

Japanese Patent Application No. 2007-186581 filed on Jul. 18, 2007, is hereby incorporated by reference in its entirety.

BACKGROUND

The present invention relates to a noise cancellation method, a receiver circuit that receives a communication signal modulated by a direct sequence spread spectrum method, and an electronic instrument including the receiver circuit.

A phenomenon referred to as crosstalk in which a signal transmitted through one channel is superimposed on another channel has been known. Since crosstalk causes a significant deterioration in signal quality, various technologies have been proposed to prevent crosstalk or remove a mixed crosstalk component. For example, technology that removes a crosstalk component by generating a signal (cancellation signal) that cancels (attenuates or removes) a mixed crosstalk component (see U.S. Pat. No. 7,050,388) has been developed.

In an electronic instrument including a receiver circuit, an alternating current signal may be generated due to a change in electromagnetic field caused by the circuit operation of an electronic circuit disposed near the receiver circuit. The alternating current signal may be transmitted to the receiver circuit and mixed into the received signal as an interference wave. Noise cancellation technology that cancels the interference wave superimposed on the received signal by generating a cancellation signal and adding the cancellation signal to the received signal has been known.

However, noise may not appropriately cancelled using this noise cancellation technology. Specifically, an interference wave may not be accurately detected (e.g., only part of the interference signal is detected, or the interference signal is detected in a state in which part of the signal which should be received is mixed). In this case, the mixed interference wave may be removed to only a small extent, or the signal which should be received may be partially attenuated.

SUMMARY

According to one aspect of the invention, there is provided a noise cancellation method comprising:

inputting an interference wave signal detected near a receiver section, and changing the phase and the amplitude of the input signal to generate a cancellation signal that cancels the input signal;

performing correlation calculations on a signal obtained by adding the cancellation signal to a communication signal received by the receiver section and a code replica of a PRN code used for the communication signal, within a given correlation calculation target range that is included within a code phase range and a frequency range; and performing the correlation calculations within a non-signal range outside the correlation calculation target range, and controlling a phase shift amount and an amplitude change rate of the input signal based on the correlation calculation result.

DESCRIPTION OF EXEMPLARY EMBODIMENTS

Figure 1:
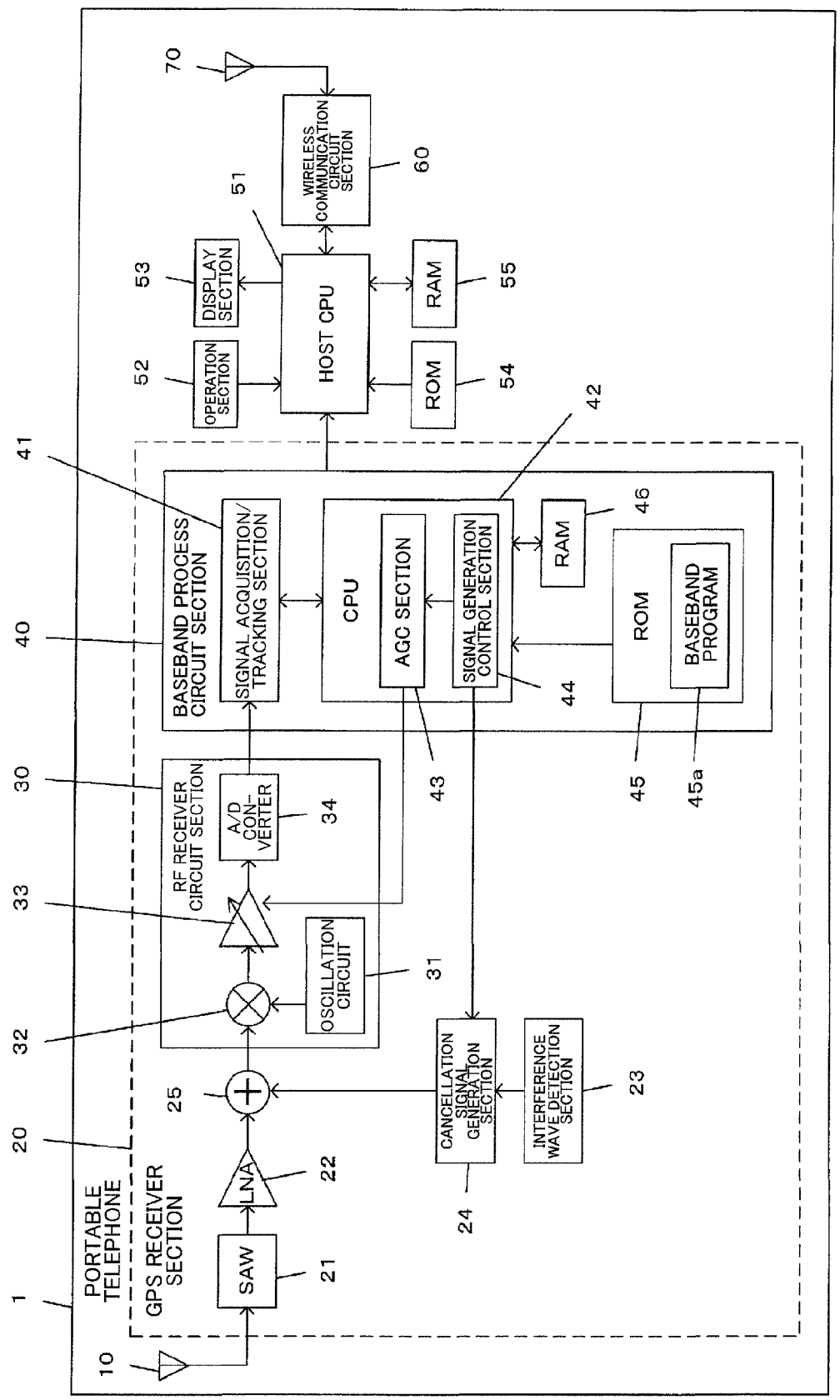
FIG. 1 is a view showing the internal configuration of a portable telephone.

The invention may implement reliable noise cancellation.

One embodiment of the invention relates to a receiver circuit comprising: a cancellation signal generation section, a signal that indicates an interference wave detected near a receiver section or an interference signal being input to the cancellation signal generation section, the receiver section receiving a communication signal modulated by a direct sequence spread spectrum method, the cancellation signal generation section changing the phase and the amplitude of the input signal by a given phase shift amount and a given amplitude change rate to generate a cancellation signal that cancels the input signal; an addition section that adds the cancellation signal to a received signal received by the receiver section; an acquisition section that performs correlation calculations on a communication signal to which the cancellation signal has been added by the addition section and a code replica of a PRN code that is a spread code used for the communication signal, within a given correlation calculation target range that is included within a code phase range of the PRN code and a reception frequency change range of the communication signal to acquire the communication signal; a range setting section that sets the correlation calculation target range; a baseband signal extraction section that extracts a baseband signal from the communication signal acquired by the acquisition section; a non-signal range setting section that sets a non-signal range outside the correlation calculation target range within the code phase range and the reception frequency change range; and a cancellation signal generation control section that performs correlation calculations on the communication signal to which the cancellation signal has been added by the addition section and the code replica within the non-signal range, and variably controls the phase shift amount and the amplitude change rate of the cancellation signal generation section based on the correlation calculation result.

Another embodiment of the invention relates to a noise cancellation method that cancels a noise signal included in a received signal received by a receiver circuit, the receiver circuit including an acquisition section that performs correlation calculations on a communication signal modulated by a direct sequence spread spectrum method and received by a receiver section and a code replica of a PRN code that is a spread code used for the communication signal, within a given correlation calculation target range that is included within a code phase range of the PRN code and a reception frequency change range of the communication signal, to acquire the communication signal, a range setting section that sets the correlation calculation target range; and a baseband signal extraction section that extracts a baseband signal from the communication signal acquired by the acquisition section, the method comprising: inputting a signal that indicates an interference wave detected near the receiver section or an interference signal, and changing the phase and the amplitude of the input signal by a given phase shift amount and a given amplitude change rate to generate a cancellation signal that cancels the input signal; adding the cancellation signal to the communication signal received by the receiver section; causing the acquisition section to perform correlation calculations on the communication signal to which the cancellation signal has been added and a code replica of a PRN code that is a spread code used for the communication signal to acquire the communication signal; setting a non-signal range outside the correlation calculation target range within the code phase range and the reception frequency change range; and performing correlation calculations on the communication signal to which the cancellation signal has been added and the code replica within the non-signal range, and variably controlling the phase shift amount and the amplitude change rate of the cancellation signal generation section based on the correlation calculation result.

According to the above configuration, a noise component included in the received signal is canceled by adding the cancellation signal to the received signal, and the phase shift amount and the amplitude change rate used when generating the cancellation signal are changed based on the correlation calculation result for the communication signal to which the cancellation signal has been added and the code replica within the non-signal range. The non-signal range is set outside the correlation calculation target range within which correlation calculations for acquiring the communication signal are performed. Therefore, the communication signal is not acquired by correlation calculations within the non-signal range. The correlation calculation result within the non-signal range corresponds to a noise component (interference signal) mixed into the received signal. The degree of noise removal due to the cancellation signal differs depending on the difference in phase or amplitude of the cancellation signal. As a result, the correlation calculation result within the non-signal range differs depending on the difference in phase or amplitude of the cancellation signal. Therefore, a cancellation signal appropriate for removing noise included in the received signal is generated by changing the phase shift amount and the amplitude change rate used when generating the cancellation signal based on the correlation calculation result within the non-signal range, whereby appropriate noise cancellation is implemented.

The above receiver circuit may further include: an amplifier section that amplifies the communication signal to which the cancellation signal has been added by the addition section by a given amplification factor; an A/D conversion section that converts the amplified signal into a digital signal; and an automatic gain control (AGC) section that variably controls the amplification factor of the amplifier section so that each signal value of the digital signal satisfies a given ratio condition; the acquisition section performing correlation calculations on the communication signal and the code replica within the correlation calculation target range, the communication signal having been converted into the digital signal by the A/D conversion section; and the cancellation signal generation control section causing the AGC section to temporarily stop changing the amplification factor of the amplifier section while performing correlation calculations on the communication signal converted into the digital signal by the A/D conversion section and the code replica within the non-signal range, and variably controlling the phase shift amount and the amplitude change rate of the cancellation signal generation section based on the correlation calculation result.

According to the above configuration, the communication signal to which the cancellation signal has been added is amplified by a given amplification factor, and the amplified signal is converted into a digital signal. When a change in the amplification factor of the amplifier section that amplifies the communication signal is temporarily stopped, the phase shift amount and the amplitude change rate used when generating the cancellation signal are variably controlled based on the correlation calculation result for the communication signal converted into the digital signal and the code replica within the non-signal range. The amplification factor of the amplifier section is changed so that each signal value of the converted digital signal satisfies the given ratio condition. On the other hand, the ratio of each signal value differs corresponding to the level of the signal before being converted into a digital signal (i.e., amplified signal). Specifically, the amplification factor is changed so that the level of the amplified signal is constant. The degree of noise removal due to the cancellation signal differs depending on the difference in phase or amplitude of the cancellation signal. As a result, the amplification factor differs depending on the difference in phase or amplitude of the cancellation signal. Therefore, a cancellation signal appropriate for removing noise mixed into the received signal is generated by variably controlling the phase shift amount and the amplitude change rate used when generating the cancellation signal based on the correlation calculation result obtained without changing the amplification factor.

In the above receiver circuit, the cancellation signal generation control section may perform a search process that searches for a phase shift amount and an amplitude change rate that minimize the correlation calculation result while changing the phase shift amount and the amplitude change rate of the cancellation signal generation section as the phase shift amount and the amplitude change rate of the cancellation signal generation section.

According to the above configuration, the search process that searches for a phase shift amount and an amplitude change rate that minimize the correlation calculation result while changing the phase shift amount and the amplitude change rate of the cancellation signal as the phase shift amount and the amplitude change rate of the cancellation signal generation section is performed when generating the cancellation signal.

In the above receiver circuit, the cancellation signal generation control section may set a value change allowable range including a minimum value of the correlation calculation result obtained by the search process, and may perform an adjustment process that adjusts the phase shift amount and the amplitude change rate of the cancellation signal generation section so that the amplification factor changed by the AGC section is included within the value change allowable range after the search process.

According to the above configuration, after the search process, the adjustment process is performed that adjusts the phase shift amount and the amplitude change rate so that the correlation calculation result is included within the value change allowable range including the minimum value of the correlation calculation result obtained by the search process. This maintains a state in which a cancellation signal having a phase and an amplitude appropriate for removing a noise component is generated.

In the above receiver circuit, the receiver section may receive a GPS satellite signal from a GPS satellite, and the receiver circuit may further include a positioning calculation section that calculates a present position based on the signal acquired by the acquisition section.

According to the above configuration, the above receiver circuit may be applied to a GPS receiver circuit that receives a GPS satellite signal from a GPS satellite and calculate the present position, for example.

A further embodiment of the invention relates to an electronic instrument comprising the above receiver circuit.

Preferred embodiments of the invention are described below with reference to the drawings. The following description is given taking an example in which the invention is applied to a portable telephone having a GPS positioning function. Note that embodiments to which the invention may be applied are not limited thereto.

Configuration

FIG. 1 is a block diagram showing the internal configuration of a portable telephone 1 according to one embodiment of the invention. As shown in FIG. 1, the portable telephone 1 has a GPS positioning function, and includes a GPS antenna 10, a GPS receiver section (i.e., receiver circuit) 20, a host central processing unit (CPU) 51, an operation section 52, a display section 53, a read only memory (ROM) 54, a random access memory (RAM) 55, a wireless communication circuit section 60, and an antenna 70.

The GPS antenna 10 is an antenna that receives an RF signal including a GPS satellite signal transmitted from a GPS satellite. The GPS satellite signal is a 1.57542 GHz communication signal that is spread spectrum modulated with a coarse/acquisition (C/A) code that differs corresponding to each satellite. The C/A code is a pseudorandom noise code (PRN) having a code length of 1023 chips and a cycle of 1 ms.

The GPS receiver section 20 extracts the GPS satellite signal from the RF signal received by the GPS antenna 10, and calculates the present position of the portable telephone 1 by performing positioning calculations based on a navigation message extracted from the GPS satellite signal and the like. The GPS receiver section 20 includes a surface acoustic wave (SAW) filter 21, a low-noise amplifier (LNA) 22, an interference wave detection section 23, a cancellation signal generation section 24, an adder 25, a radio frequency (RF) receiver circuit section 30, and a baseband process circuit section 40. The RF receiver circuit section 30 and the baseband process circuit section 40 of the GPS receiver section 20 may be produced as different large scale integrated (LSI) circuits, or may be produced in one chip. The entire GPS receiver section 20 including the SAW filter 21, the LNA 22, and the like may be produced in one chip.

The SAW filter 21 is a bandpass filter. The SAW filter 21 allows a given band signal of the RF signal input from the GPS antenna 10 to pass through while blocking a frequency component outside the given band, and outputs the resulting signal. The LNA (low-noise amplifier) 22 amplifies the signal input from the SAW filter 21, and outputs the amplified signal.

The interference wave detection section 23 detects an interference wave (noise) mixed into the signal received by the GPS antenna 10. The interference wave detection section 23 includes a pickup coil or the like that detects a change in electromagnetic field near the GPS antenna 10 and the GPS receiver section 20, and outputs the detected change in electromagnetic field as an interference signal. Note that the interference signal detection section 23 may be provided at an arbitrary position outside the GPS receiver section 20 instead of disposing the interference signal detection section 23 in the GPS receiver section 20, and may be connected to the GPS receiver section 20 via interconnects such as signal lines. The interference signal detection section 23 detects noise (i.e., a change in electromagnetic field) mixed into the received signal. The detection target of a change in electromagnetic field may be an arbitrary electronic circuit. For example, the detection target may be a portable telephone or wireless LAN communication circuit (e.g., wireless communication circuit section 60), a processor such as a CPU, a circuit provided in a liquid crystal display device, or the like. Since it is necessary to detect a change in electromagnetic field that serves as an interference wave for the received signal, it is desirable that the detection target be an electronic circuit positioned near the GPS receiver section 20.

The cancellation signal generation section 24 generates a cancellation signal for removing an interference wave mixed into the received signal. Specifically, the cancellation signal generation section 24 generates the cancellation signal by shifting the phase of a signal, obtained by shifting the phase of the interference signal detected by the interference wave detection section 23 by 180 degrees, by a phase shift amount $\phi$ while attenuating the signal by an attenuation factor $\alpha$ (amplitude change rate), based on a cancellation control signal input from a signal generation control section 44. The phase shift amount $\phi$ and the attenuation factor $\alpha$ used when generating the cancellation signal are changed or set appropriately by causing the signal generation control section 44 to control generation of the cancellation signal at a given timing. When normally acquiring and tracking the GPS satellite signal, the cancellation signal is generated using the phase shift amount $\phi$ and the attenuation factor $\alpha$ set in this manner.

The adder 25 adds the cancellation signal generated by the cancellation signal generation section 24 to the signal amplified by the LNA 22.

The RF receiver circuit section 30 down-converts the signal (RF signal) input from the adder 25 into an intermediate-frequency (IF) signal, converts the IF signal into a digital signal, and outputs the resulting digital signal. The RF receiver circuit section 30 includes an oscillation circuit 31, a mixer 32, an amplifier 33, and an A/D converter 34.

The oscillation circuit 31 is a crystal oscillator or the like, and generates a local oscillation signal having a given oscillation frequency. The mixer 32 multiplies the RF signal input from the adder 25 by the local oscillation signal input from the oscillation circuit 31 (i.e., synthesizes the RF signal and the local oscillation signal) to generate an IF signal. The amplifier 33 is a variable amplifier that amplifies the IF signal generated by the mixer 32 while changing the amplification factor based on a gain control signal input from an AGC section 43.

Figure 2:
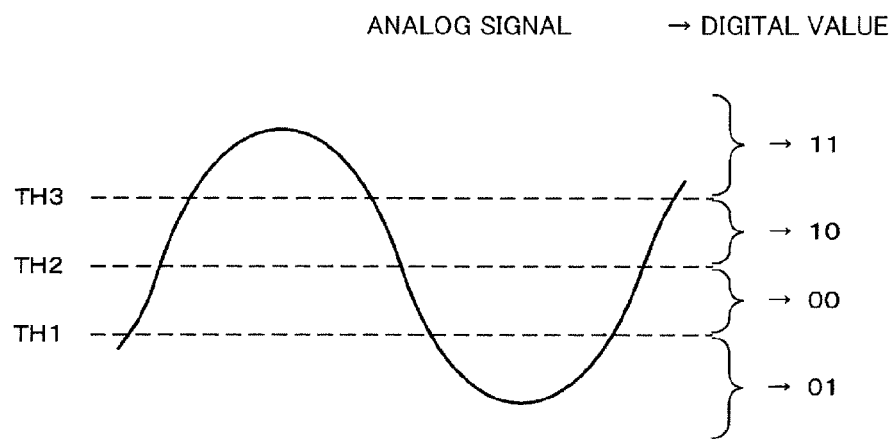
FIG. 2 is a view showing the A/D conversion principle of an A/D converter.

The A/D converter 34 converts the IF signal amplified by the amplifier 33 into a multi-bit (two bits or more) digital signal. FIG. 2 is a view showing the A/D conversion principle of the A/D converter 34. FIG. 2 shows two-bit conversion. In this case, three threshold values TH1 to TH3 (TH1<TH2<TH3) are provided, and the IF signal is converted into a two-bit digital value (i.e., "00", "01", "10", or "11") corresponding to the threshold values TH between which the level of the conversion-target analog signal is positioned.

Again referring to FIG. 1, the baseband process circuit section 40 acquires/tracks the GPS satellite signal from the IF signal input from the RF receiver circuit section 30, and performs pseudo-range calculations, positioning calculations, and the like based on a navigation message, time information, and the like extracted by decoding the data contained in the GPS satellite signal. The baseband process circuit section 40 includes a signal acquisition/tracking section 41, a CPU 42, a ROM 45, and a RAM 46.

The signal acquisition/tracking section 41 includes a code generation circuit that generates a code replica, a correlation calculation circuit that performs correlation calculations, and the like. The signal acquisition/tracking section 41 acquires/tracks the GPS satellite signal based on the IF signal input from the RF receiver circuit section 30. The signal acquisition/tracking section 41 acquires the GPS satellite signal by extracting the GPS satellite signal from the IF signal by performing a correlation process on the IF signal. Specifically, the signal acquisition/tracking section 41 performs a coherent process that calculates the correlation value between the IF signal and a pseudo-generated code replica using FFT calculations. The signal acquisition/tracking section 41 then performs an incoherent process that calculates the integrated correlation value by integrating the correlation values (i.e., coherent process results). As a result, the phases of the C/A code and a carrier frequency (Doppler frequency) contained in the GPS satellite signal are obtained so that the GPS satellite is acquired. The signal acquisition/tracking section 41 then tracks the acquired GPS satellite signal. The signal acquisition/tracking section 41 tracks the GPS satellite signals by synchronously holding the acquired GPS satellite signals in parallel. For example, the signal acquisition/tracking section 41 performs a code loop which is implemented by a delay locked loop (DLL) and tracks the phase of the C/A code, and a carrier loop which is implemented by a phase locked loop (PLL) and tracks the phase of the carrier frequency.

The correlation calculation process performed on the IF signal and the code replica includes setting a search range that is a given frequency and code phase range corresponding to the acquisition target GPS satellite signal, and performing correlation calculations in the phase direction for detecting the start position (code phase) of the C/A code and correlation calculations in the frequency direction for detecting the Doppler frequency within the search range.

Figure 3:
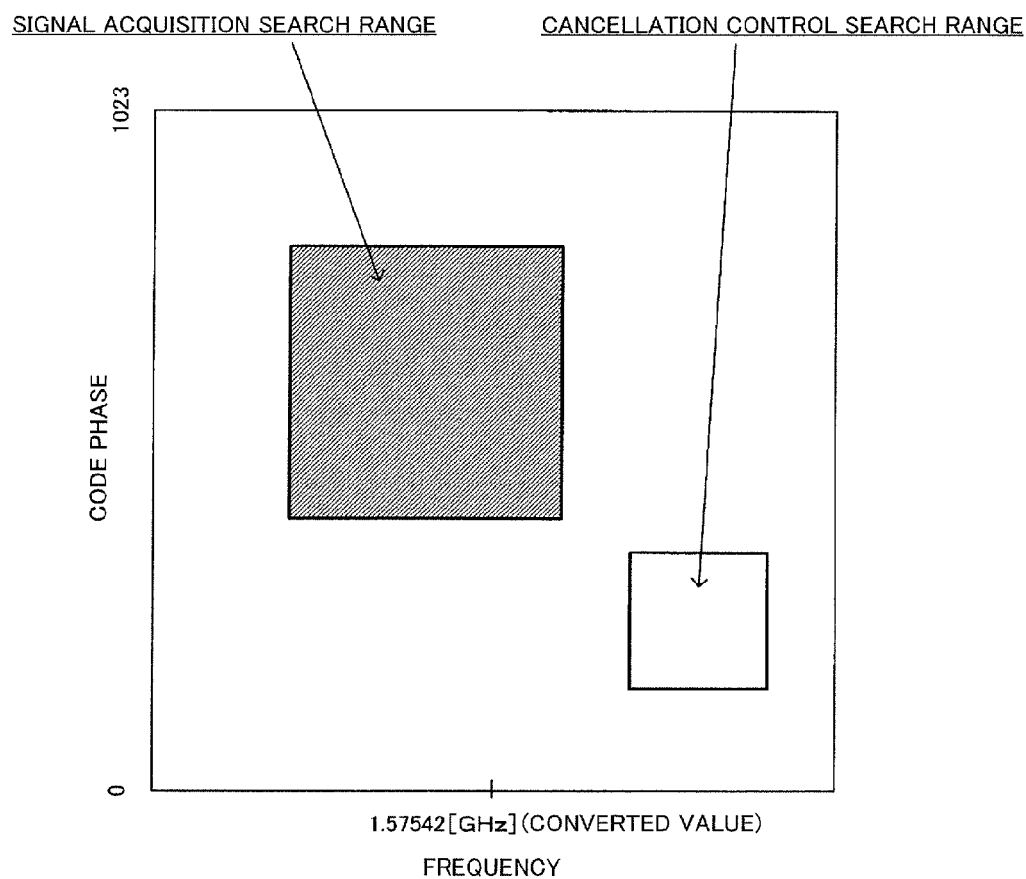
FIG. 3 is a view illustrative of a search range.

FIG. 3 is a view showing an example of the search range. In FIG. 3, the horizontal axis indicates the frequency, and the vertical axis indicates the code phase. The search range is defined within a reception frequency change range around 1.57542 GHz (i.e., the carrier frequency of the GPS satellite signal) and a code phase range of 1023 chips (i.e., the chip length of the C/A code). The frequency is converted into the carrier frequency because the signal input to the baseband process circuit section 40 is an IF signal obtained by down-converting the frequency of the GPS satellite signal into an intermediate frequency. When normally acquiring the GPS satellite signal, a range including the carrier frequency (converted value; hereinafter the same) of the acquisition target GPS satellite signal and the phase (code phase) of the C/A code is set as the signal acquisition search range (correlation calculation target range). The signal acquisition search range differs depending on the preceding located position and the presence or absence of satellite orbit information and the like. For example, the signal acquisition search range is set to be a relatively narrow range when the approximate Doppler frequency of the acquisition target GPS satellite signal and the code phase of the C/A code are known otherwise the signal acquisition search range is set to be a relatively wide range. When controlling generation of the cancellation signal, a range other than the signal acquisition search range (i.e., a range that does not include the carrier frequency of the acquisition target GPS satellite signal and the code phase of the C/A code) is set as the cancellation signal generation control search range (non-signal range). Specifically, the cancellation control search range does not include the carrier frequency of the acquisition target GPS satellite signal and the code phase.

Again referring to FIG. 1, the CPU 42 includes the AGC section 43 and the signal generation control section 44. The CPU 42 controls each section of the baseband process circuit section 40, and performs various calculation processes including a baseband process. In the baseband process, the CPU 42 causes the signal acquisition/tracking section 41 to generate the code replica of the PRN code corresponding to the acquisition target GPS satellite signal and acquire/track the GPS satellite signal. The CPU 42 decodes the data contained in the GPS satellite signal acquired/tracked by the signal acquisition/tracking section 41 to extract the navigation message, and performs pseudo-range calculations, positioning calculations, and the like to locate the present position.

The AGC section 43 controls the amplification factor of the amplifier 33 based on the IF signal input from the RF receiver circuit section 30. Specifically, the AGC section 43 controls the amplification factor of the amplifier 33 so that the ratio of the signal value of each digital signal converted by the A/D converter 34 satisfies a given ratio condition to control the level of the input analog signal. The ratio condition is a condition whereby the conversion efficiency of the A/D converter 34 becomes a maximum. For example, when using two-bit conversion shown in FIG. 2, the ratio condition is a condition whereby the frequency ratio of each of the four converted signal values "10", "00", "11", and "01" becomes equal.

The signal generation control section 44 performs a cancellation control process that controls generation of the cancellation signal generated by the cancellation signal generation section 24 at an appropriate timing (e.g., every 30 minutes). Specifically, the signal generation control section 44 causes the AGC section 43 to temporarily stop changing the amplification factor of the amplifier 33 to fix the amplification factor. The amplification factor may be fixed at an arbitrary value (e.g., the present value). The signal generation control section 44 also changes the search range of the signal acquisition/tracking section 41 to the cancellation control search range. Specifically, the signal generation control section 44 sets a range other than the present search range (i.e., the signal acquisition search range corresponding to the acquisition target GPS satellite signal) to be the cancellation control search range. The signal generation control section 44 generates the cancellation control signal that controls the phase shift amount $\phi$ and the attenuation factor $\alpha$ when generating the cancellation signal based on the integrated correlation value (i.e., the correlation calculation results of the signal acquisition/tracking section 41). Since the GPS satellite signal cannot be acquired using the cancellation control search range, the resulting integrated correlation value may be considered to be a value relating to an interference wave mixed into the received signal (i.e., the power of an interference wave (noise) mixed into the received signal).

Figure 4:
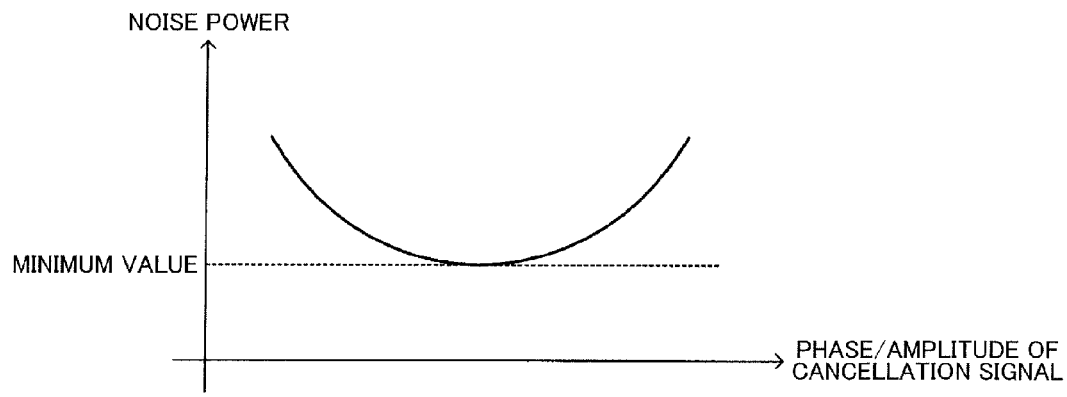
FIG. 4 is a view showing the noise power with respect to the phase/amplitude of a cancellation signal.

FIG. 4 is a view showing the noise power with respect to the phase or amplitude of the cancellation signal. The noise power changes corresponding to the degree of noise removal based on the cancellation signal. The degree of noise removal changes corresponding to the phase or amplitude of the cancellation signal. Specifically, the noise power changes corresponding to the phase or amplitude of the cancellation signal, and becomes a minimum when the interference wave has been removed to the maximum extent, as shown in FIG. 4. Since the interference wave contains thermal noise that cannot be removed using the cancellation signal, the noise power does not become zero. Therefore, the signal generation control section 44 controls the phase shift amount $\phi$ and the attenuation factor $\alpha$ used when the cancellation signal generation section 24 generates the cancellation signal so that the integrated correlation value becomes a minimum.

Specifically, the signal generation control section 44 searches for the phase shift amount $\phi$ that minimizes the integrated correlation value by increasing or decreasing the phase shift amount $\phi$ by a given phase shift change amount $\Delta\phi$ while setting the attenuation factor $\alpha$ at a constant value. When the signal generation control section 44 has determined the phase shift amount φ that minimizes the integrated correlation value, the signal generation control section 44 searches for the attenuation factor α that minimizes the integrated correlation value by increasing or decreasing the attenuation factor α by a given attenuation factor change amount Δα while setting the phase shift amount φ at the determined value. When the signal generation control section 44 has determined the attenuation factor α that minimizes the integrated correlation value, the signal generation control section 44 determines the phase shift amount φ and the attenuation factor α to be values appropriate for generating the cancellation signal by which noise is removed to the maximum extent.

The ROM 45 stores a system program that causes the CPU 42 to control each section of the baseband process circuit section 40 and the RF receiver circuit section 30, a program and data necessary for the CPU 42 to implement various processes including the baseband process, a baseband program 45a for implementing the baseband process, and the like. The RAM 46 is used as a work area for the CPU 42, and temporarily stores a program and data read from the ROM 45, the calculation results of the CPU 42 based on various programs, and the like.

The host CPU 51 controls each section of the portable telephone 1 based on various programs such as a system program stored in the ROM 54. Specifically, the host CPU 51 mainly implements a telephone call function, and also performs a process that implements various functions including a navigation function such as causing the display section 53 to display a navigation screen in which the present position of the portable telephone 1 input from the baseband process circuit section 40 is plotted on a map.

The operation section 52 is an input device including an operation key, a button switch, and the like. The operation section 52 outputs an operation signal corresponding to the operation of the user to the host CPU 51. Various instructions such as a positioning start/finish instruction are input by operating the operation section 52. The display section 53 is a display device such as a liquid crystal display (LCD). The display section 53 displays a display screen (e.g., navigation screen and time information) based on a display signal input from the host CPU 51.

The ROM 54 stores a system program that causes the host CPU 51 to control the portable telephone 1, a program and data necessary for implementing the navigation function, and the like. The RAM 55 is used as a work area for the host CPU 51. The RAM 55 temporarily stores a program and data read from the ROM 54, data input from the operation section 52, calculation results of the host CPU 51 based on various programs, and the like.

The wireless communication circuit section 60 is a portable telephone communication circuit section that includes an RF conversion circuit, a baseband process circuit, and the like, and transmits and receives a radio signal under control of the host CPU 51. The antenna 70 is an antenna that transmits and receives a portable telephone radio signal between the portable telephone 1 and a radio base station installed by a communication service provider of the portable telephone 1.

Process Flow

Figure 5:
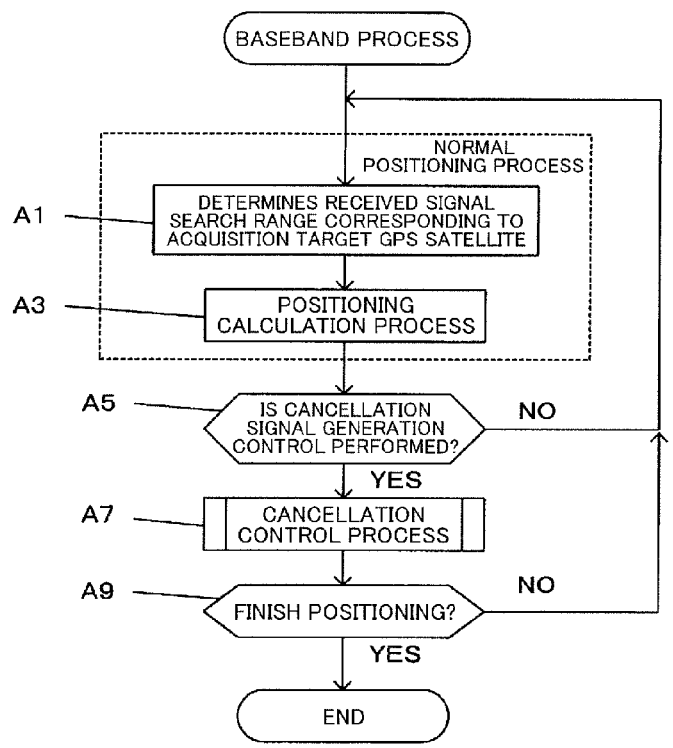
FIG. 5 is a flowchart showing a baseband process.

FIG. 5 is a flowchart illustrative of the flow of the baseband process. This process is implemented by causing the CPU 42 to execute the baseband program 45a. As shown in FIG. 5, the CPU 42 performs a normal positioning process. Specifically, the CPU 42 sets the signal acquisition range corresponding to the acquisition target GPS satellite signal to be the received signal search range of the signal generation control section 44 (step A1). The CPU 42 extracts the navigation message from the GPS satellite signal acquired/tracked by the signal acquisition/tracking section 41, and performs a positioning calculation process that calculates the pseudo-range and calculates the present position (step A3). The CPU 42 then determines whether or not to perform cancellation signal generation control. When the CPU 42 has determined that cancellation signal generation control is unnecessary (step A5: NO), the CPU 42 returns to the step A1. When the CPU 42 has determined that cancellation signal generation control is necessary (step A5: YES), the signal generation control section 44 performs a cancellation control process (step A7).

Figure 6:
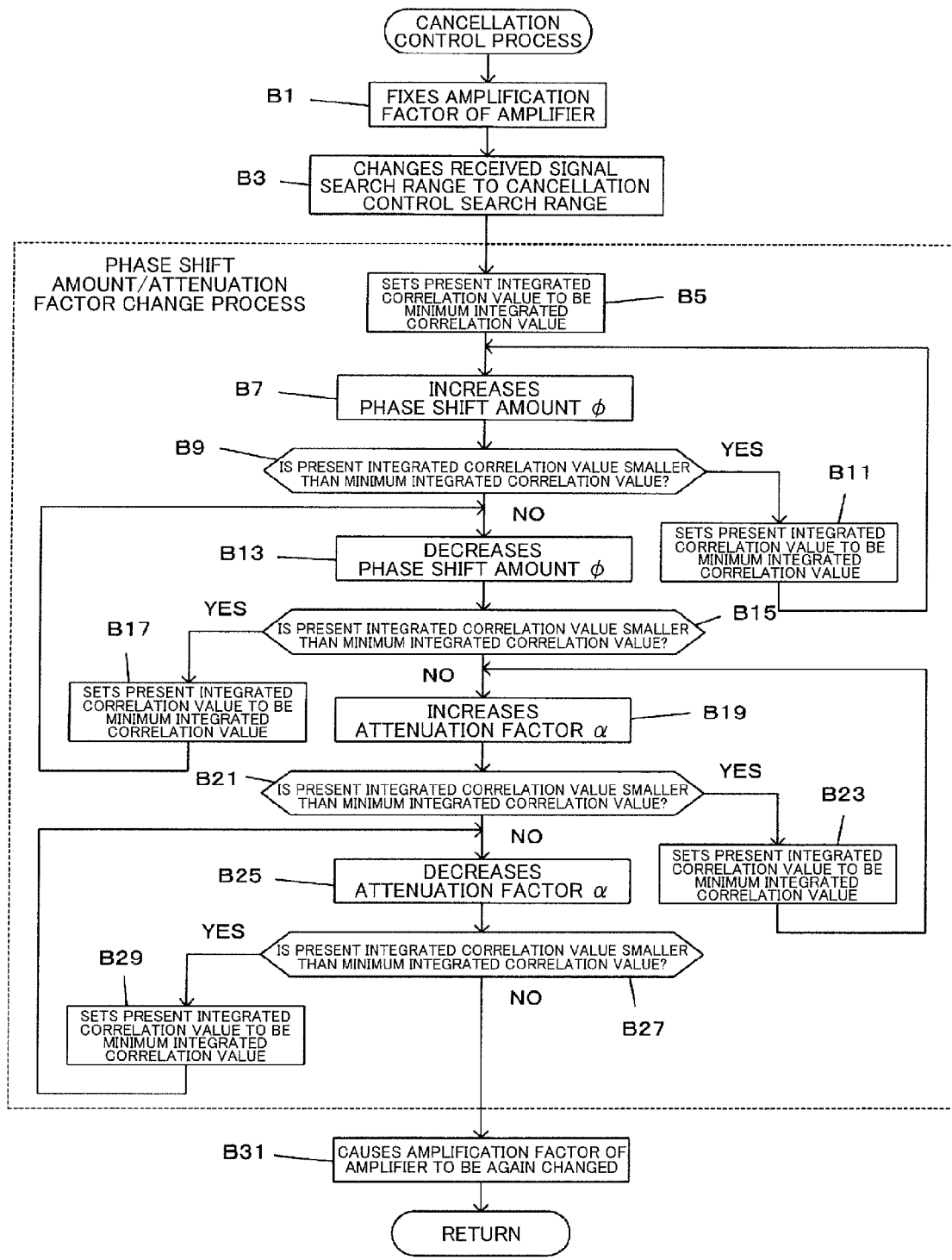
FIG. 6 is a flowchart showing a cancellation control process executed during the baseband process.

FIG. 6 is a flowchart illustrative of the flow of the cancellation control process. As shown in FIG. 6, the signal generation control section 44 causes the AGC section 43 to temporarily stop changing the amplification factor of the amplifier 33 to fix the amplification factor of the amplifier 33 (step B1). The signal generation control section 44 changes the received signal search range of the signal acquisition/tracking section 41 to the cancellation control search range (i.e., a range other than the present signal acquisition search range) (step B3).

The signal generation control section 44 then performs a phase shift amount/attenuation factor change process to determine the phase shift amount φ and the attenuation factor α of the cancellation signal so that an interference wave mixed into the received signal becomes a minimum. Specifically, the signal generation control section 44 sets the present integrated correlation value from the signal acquisition/tracking section 41 to be the minimum integrated correlation value (step B5). The signal generation control section 44 increases the phase shift amount φ without changing the attenuation factor α (step B7). When the present integrated correlation value is smaller than the minimum integrated correlation value (step B9: YES), the signal generation control section 44 sets the present integrated correlation value to be the minimum integrated correlation value (step B11). The signal generation control section 44 then returns to the step B7, and repeats a similar process while further increasing the phase shift amount φ.

When the present integrated correlation value has become equal to or larger than the minimum integrated correlation value as a result of increasing the phase shift amount φ (step B9: NO), the signal generation control section 44 decreases the phase shift amount φ (step B13). When the present integrated correlation value is smaller than the minimum integrated correlation value (step B15: YES), the signal generation control section 44 sets the present integrated correlation value to be the minimum integrated correlation value (step B17). The signal generation control section 44 then returns to the step B13, and repeats a similar process while further decreasing the phase shift amount φ.

When the present integrated correlation value has become equal to or larger than the minimum integrated correlation value as a result of decreasing the phase shift amount φ (step B15: NO), the signal generation control section 44 increases the attenuation factor α without changing the phase shift amount φ (step B19). When the present integrated correlation value is smaller than the minimum integrated correlation value (step B21: YES), the signal generation control section 44 sets the present integrated correlation value to be the minimum integrated correlation value (step B23). The signal generation control section 44 then returns to the step B19, and repeats a similar process while further increasing the attenuation factor α.

When the present integrated correlation value has become equal to or larger than the minimum integrated correlation value as a result of increasing the attenuation factor α (step B21: NO), the signal generation control section 44 decreases the attenuation factor α (step B25). When the present integrated correlation value is smaller than the minimum integrated correlation value (step B27), the signal generation control section 44 sets the present integrated correlation value to be the minimum integrated correlation value (step B29). The signal generation control section 44 then returns to the step B25, and repeats a similar process while further decreasing the attenuation factor $\alpha$.

When the present integrated correlation value has become equal to or larger than the minimum integrated correlation value as a result of decreasing the attenuation factor $\alpha$ (step B27: NO), the signal generation control section 44 determines that the present phase shift amount $\phi$ and attenuation factor $\alpha$ are optimum for removing noise mixed into the received signal. The phase shift amount/attenuation factor change process is thus completed.

The signal generation control section 44 then causes the AGC section 43 to again change the amplification factor of the amplifier 33 (step B31). The signal generation control section 44 thus completes the cancellation control process.

When the cancellation control process has been completed, the CPU 42 determines whether or not to finish positioning. When the CPU 42 has determined to continue positioning (step A9: NO), the CPU 42 returns to the step A1. When the CPU 42 has determined to finish positioning (step A9: YES), the CPU 42 finishes the baseband process.

Effects

According to this embodiment, the signal generation control section 44 provided in the portable telephone 1 having a GPS function controls generation of the cancellation signal by the cancellation signal generation section 24 based on the integrated correlation value that is the correlation calculation result for the IF signal and the code replica obtained by the signal acquisition/tracking section 41. Specifically, the signal generation control section 44 changes the phase shift amount $\phi$ and the attenuation factor $\alpha$ used when generating the cancellation signal so that the integrated correlation value becomes a minimum. Therefore, a cancellation signal that causes an interference wave included in the received signal to be removed to the maximum extent is generated so that appropriate noise cancellation is implemented.

Modification

Embodiments to which the invention may be applied are not limited to the above-described embodiments. Various modifications and variations may be made without departing from the spirit and scope of the invention.

(A) Reception Channel

For example, the above embodiments have been described taking an example in which the number of reception channels of the GPS receiver section 20 is one. The invention may be similarly applied to the case where the GPS receiver section 20 has a plurality of channels. In this case, different GPS satellite signals are respectively assigned to the plurality of channels as the acquisition target. One of these channels is used for cancellation signal generation control during cancellation signal generation control.

(B) AGC

The above embodiments have been described taking an example in which the CPU 42 includes the AGC section 43 and controls the amplification factor of the amplifier 33 by means of software. Note that the amplification factor of the amplifier 33 may be controlled by means of hardware.

Figure 7:
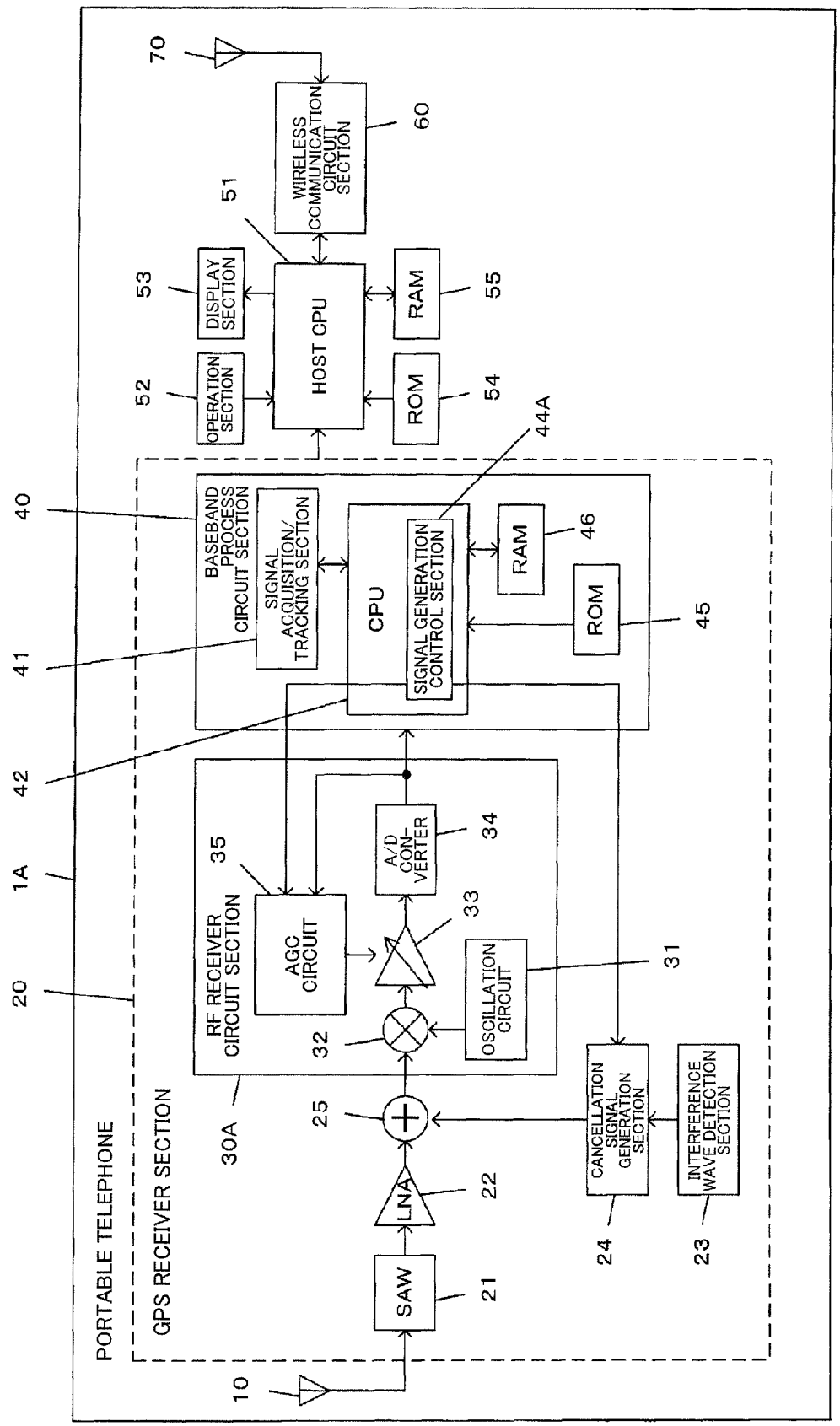
FIG. 7 is a view showing the internal configuration of a portable telephone including an AGC circuit.

FIG. 7 is a view showing the internal configuration of a portable telephone 1A in this case. In FIG. 7, the same elements as in FIG. 1 are indicated by the same symbols. In the portable telephone 1A shown in FIG. 7, an RF receiver circuit section 30A includes the oscillation circuit 31, the mixer 32, the amplifier 33, the A/D converter 34, and an AGC circuit 35.

The AGC circuit 35 controls the amplification factor of the amplifier 33 based on the IF signal digitally converted by the A/D converter 34. Specifically, the AGC section 35 controls the amplification factor of the amplifier 33 so that the ratio of the signal value of each digital signal converted by the A/D converter 34 satisfies a given ratio condition in the same manner as the AGC section 43. A signal generation control section 44A causes the AGC circuit 35 to temporarily stop gain control (i.e., control of the amplification factor of the amplifier 33) during cancellation signal generation control, and controls the phase shift amount $\phi$ and the attenuation factor $\alpha$ used when the cancellation signal generation section 24 generates the cancellation signal so that the integrated correlation value calculated by the signal acquisition/tracking section 41 becomes a minimum.

(C) Detection of Interference Signal

The above embodiments have been described taking an example in which the interference wave detection section 23 detects noise near the receiver section. Note that the interference signal may be directly input without providing the interference wave detection section 23. Specifically, the cancellation signal is generated while regarding a signal transmitted and received through the antenna 70 as the interference signal.

Figure 8:
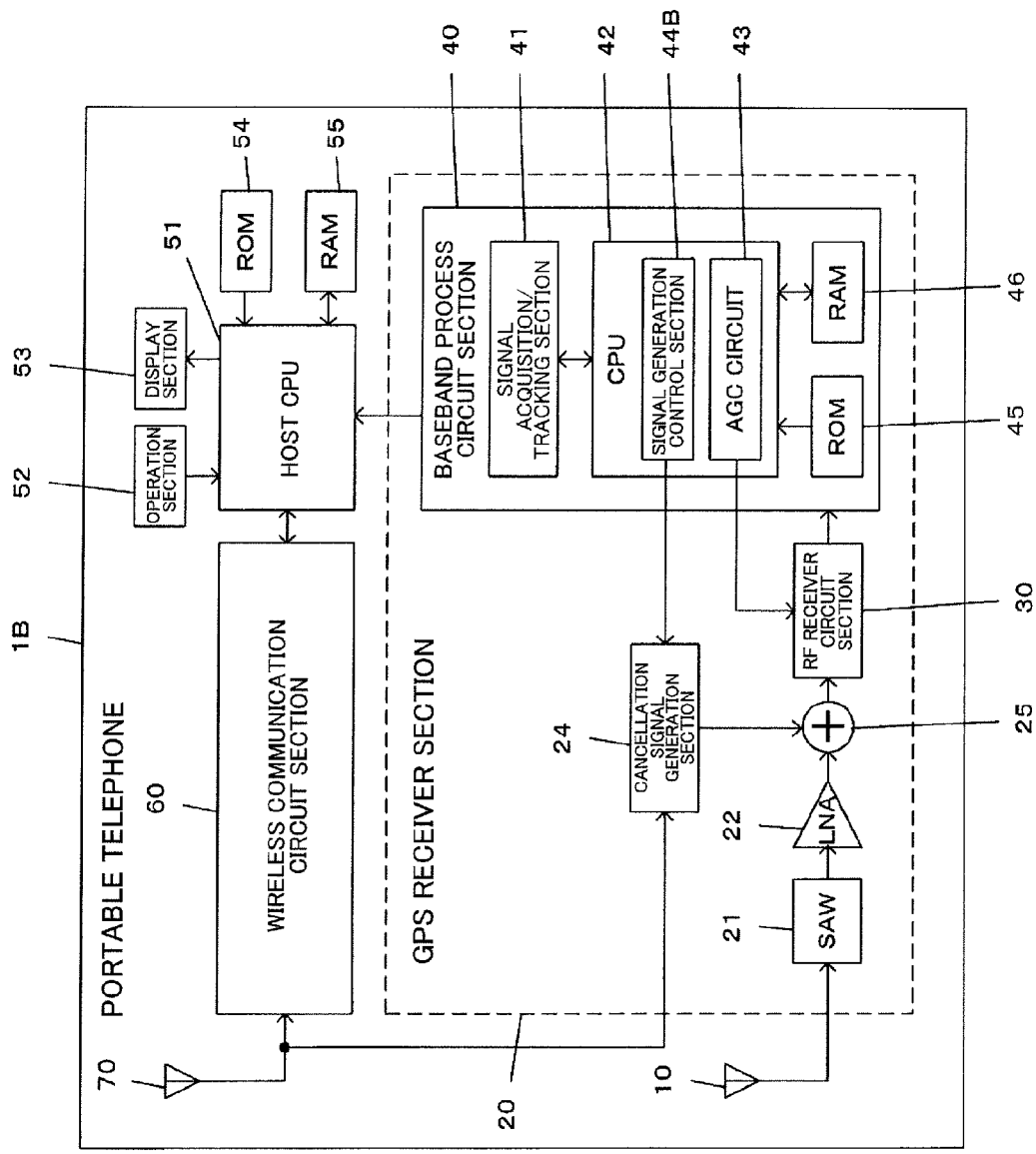
FIG. 8 is a view showing the internal configuration of a portable telephone that uses a signal received through an antenna as an interference signal.

FIG. 8 is a view showing the internal configuration of a portable telephone 1B in this case. In FIG. 8, the same elements as in FIG. 1 are indicated by the same symbols. In the portable telephone 1B shown in FIG. 8, a signal transmitted and received through the antenna 70 is input to the wireless communication circuit section 60 and the cancellation signal generation section 24. The cancellation signal generation section 24 generates the cancellation signal while regarding the input signal as the interference signal.

(D) Correlation Value Used as Reference for Cancellation Signal Generation

The above embodiments have been described taking an example in which the signal generation control section 44 performs cancellation signal generation control based on the integrated correlation value obtained by the incoherent process as the correlation calculation result of the signal acquisition/tracking section 41. Note that the correlation value obtained by the coherent process may be used for cancellation signal generation control.

(E) Electronic Instrument

The above embodiments have been described taking the portable telephone having a GPS function as an example. Note that the invention may also be applied to other electronic instruments such as a portable navigation system, a car navigation system, a personal digital assistant (PDA), and a wristwatch.

(F) Applicable System

The above embodiments have been described taking an example utilizing the GPS. Note that the invention may also be applied to other satellite positioning systems such as the GALILEO that utilizes the CDMA method in the same manner as the GPS. The invention may also be applied to systems that transmit a signal modulated by a direct sequence spread spectrum method (e.g., wireless LAN conforming to the IEEE802.11b standard) in addition to satellite positioning systems.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A noise cancellation method applied to a communication apparatus, the noise cancellation method comprising:

receiving a communication signal by a receiver section;

inputting an interference wave signal detected near the receiver section;

generating a cancellation signal that cancels the interference wave signal;

first correlating an added signal to a code replica within a given correlation calculation target range, the added signal being obtained by adding the cancellation signal to the communication signal;

second correlating the added signal to the code replica within a non-signal range outside the correlation calculation target range;

controlling a phase shift amount and an amplitude change rate of the interference wave signal based on the second correlating result; and changing a phase and amplitude of the interference wave signal based on the phase shift amount and the amplitude change rate to generate the cancellation signal.

2. The noise cancellation method as defined in claim 1, the method further including performing a search process that searches for the phase shift amount and the amplitude change rate that minimize the second correlating result.

* * * * *